UNITED STATES PATENT OFFICE.

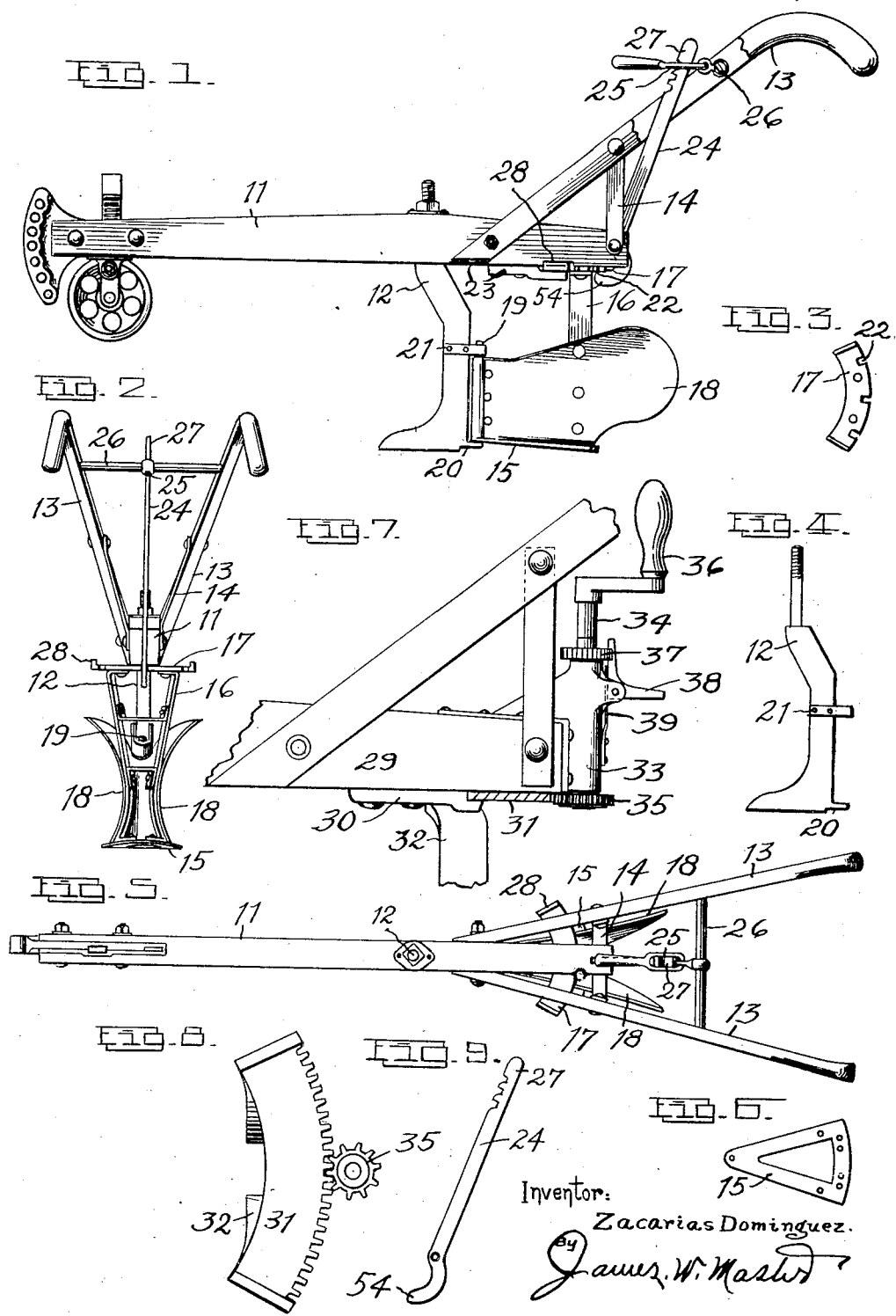

ZACARIAS DOMINGUEZ, OF LOS ANGELES, CALIFORNIA.

GARDEN SIDEHILL-PLOW.

1,350,923.　　　　Specification of Letters Patent.　　Patented Aug. 24, 1920.

Application filed March 5, 1918. Serial No. 220,501.

*To all whom it may concern:*

Be it known that I, ZACARIAS DOMINGUEZ, a subject of the King of Spain, and a resident of Los Angeles, in the county of Los Angeles and State of California, have invented a new and useful Improvement in Garden Sidehill-Plows, of which the following is a specification.

This invention relates to garden tools, and more particularly to garden plows, and the object thereof is to provide an improved tool of this class adaptable to turn the ground for cultivation, in the same direction and upon successively traversing the field.

Other objects are to provide means for adjusting the plow so that the soil may be thrown either to the right or left side of the plow, and to provide means for adjusting the wheel relatively to the plow beam to vary the depth of the cut to be taken in the soil, and with these and other objects in view, the invention consists of a plow of the class specified, tractor means therefor, and adjusting means whereby the device may be readily altered and adjusted for satisfactorily turning and tilling the soil.

The invention is fully disclosed in the following description, and the accompanying drawing which forms a part thereof, and in which the several parts of my invention are designated by suitable reference characters in each of the several views.

In the drawings: Figure 1 is a side elevation of a plow made according to my invention, the same being shown in the form adapted for horse traction; Fig. 2 is a rear elevation of the same; Fig. 3 is a detail plan view of the notched sector which provides for adjustment of the plow to turn the soil to the right or left; Fig. 4 is a detail side view of the combined standard and plow share; Fig. 5 is a top plan view of the plow; Fig. 6 is a plan and detail view of the brace connecting the mold boards; Fig. 7 is a fragmental detail view of a plow having a modified form of adjustment for the mold boards; Fig. 8 is a diagram of the rack and pinion adjustment as shown in Fig. 7; Fig. 9 is a side view of the adjusting lever.

In the practice of my invention as shown in Figs. 1 to 6, inclusive, I provide a plow beam 11, having bolted thereto the combined standard and plow share 12, and the handles 13, which are supported by the braces 14, connecting the beam and handles. For turning the soil, I provide a frame consisting of the bottom brace 15, side braces 16, and the transverse cross sector 17, and two mold-boards 18, of similar contour, secured thereto. The mold-boards are curved and so mounted as to diverge rearwardly. Affixed to the mold-boards, is a pivotal bar 19, mounted at the bottom in lug 20, formed integrally upon the plow-share and standard, and at the top, mounted in bearing member 21, which is detachably secured to the standard.

The sector member 17, is provided with notches 22, and is adapted to slide transversely between the plow beam 11, and lug 23, fixed to the bottom of the beam.

A lever 24, pivotally mounted in the end of the plow-beam, is adapted to engage with any of the notches 22, in member 17, and thereby hold the mold-boards in various positions, relative to the plow-beam, so that the mold-boards shall each act as a turning element for the soil, or either may be set at an angle with the plow-beam, so that one shall serve as a turning member, and the other shall serve as a land-side. To retain lever 24 in any of its service positions, I provide a latch 25, hingedly connected to the cross-bar 26, extending transversely between the handles, and engaging with a notched end 27, of lever 24. Flanges 28, on the outer ends of member 17, serve to limit the angular movement of the soil turning elements, when lever 24 is released for adjustment.

The manipulation of the shifting means for adjusting the mold-boards to the right or left relative to the plow-beam, will probably be understood from the foregoing description.

In the modified form shown in Figs. 7, and 8, the plow-beam 29, is provided with a lug 30, to retain the sector member 31, supported by braces 32. A bracket 33, is mounted on the end of the plow-beam, and has mounted therein a revoluble shaft 34, to one of which is fixed a pinion 35, and to the opposite end a manual operating handle 36, and intermediate thereof, the pinion 37. The sector member 31, constitutes a rack which is in constant mesh with pinion 35. Adjustment is made by turning the handle 36, and shaft 34. To retain the sector in any position within the limits of its movement, I provide a latch 38, retained in operative position with pinion 37, by the spring 39. Upon releasing the latch 38, and rotating the handle in either direction, the sector member 31, may be adjusted to any position.

What is claimed is:

1. The combination with a plow-beam and standard, handles fixed to the plow-beam, and a brace connecting the handles, of a swinging frame pivotally connected to the standard and consisting of a bottom brace, side braces, and a cross sector connecting the side braces and having a series of notches, angularly and rearwardly diverging mold-boards fixed to the bottom and side braces of the frame, a lug fixed to the bottom of the plow-beam, said cross sector sliding between the lug and beam, a lever mounted on the beam and adapted to engage with the notches in the movable cross sector part of the swinging frame, and a latch pivotally connected to the handle-connecting brace and adapted to secure the retaining lever in operative engagement with the cross sector part of the frame.

2. The combination with a plow-beam, a standard, and handles fixed to the plow-beam, of a frame pivotally connected to the standard and having a notched sector portion, a lug on the bottom of the beam, said sector portion of the frame sliding between the lug and beam, a retaining lever pivotally connected to the beam and adapted to engage with the notched sector portion of the frame, and latch means carried by the handles to secure the retaining lever in operative position.

3. A plow embodying a beam, handles attached thereto, a standard detachably secured to the beam, a plow-share integral with the standard, a lug integral with the standard and at the bottom thereof, and a bearing member detachably secured to the standard, a frame pivotally connected to the bottom lug on the standard and to the detachable bearing member, soil-turning elements fixed to the swinging frame, a cross sector forming the top portion of the swinging frame, and being provided with a series of notches, a detent member pivotally connected to the beam and adapted to engage with the notches in the cross sector part of the swinging frame, a transverse brace connecting the handles, and a latch member loosely connected to said transverse brace and engaging with the free end of the detent lever.

In testimony whereof I hereunto affix my signature to the foregoing specification this 18th day of February, 1918.

ZACARIAS DOMINGUEZ.

Witnesses:
 JUSTO R. OSTOLAZA,
 FREDERIC M. KEENEY.